United States Patent
Rao et al.

(10) Patent No.: US 8,224,831 B2
(45) Date of Patent: Jul. 17, 2012

(54) VIRTUALIZATION OF METADATA FOR FILE OPTIMIZATION

(75) Inventors: Goutham Rao, San Jose, CA (US); Eric Brueggemann, Cupertino, CA (US); Murali Bashyam, Fremont, CA (US); Carter George, Portland, OR (US); Mark Taylor, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 383 days.

(21) Appl. No.: 12/038,219

(22) Filed: Feb. 27, 2008

(65) Prior Publication Data

US 2009/0216774 A1 Aug. 27, 2009

(51) Int. Cl.
*G06F 7/00* (2006.01)
*G06F 17/30* (2006.01)

(52) U.S. Cl. ......... 707/758; 707/822; 707/824; 707/825

(58) Field of Classification Search ............... 707/825, 707/999.001, 999.002, E17.01, 706, 822, 707/758, 824
See application file for complete search history.

(56) References Cited

U.S. PATENT DOCUMENTS

| | | | |
|---|---|---|---|
| 5,991,862 A | 11/1999 | Ruane | |
| 6,044,370 A | 3/2000 | Anfindsen | |
| 6,161,192 A * | 12/2000 | Lubbers et al. | 714/6.21 |
| 6,522,268 B2 | 2/2003 | Belu | |
| 6,542,967 B1 * | 4/2003 | Major | 711/134 |
| 6,725,392 B1 | 4/2004 | Frey et al. | |
| 6,760,721 B1 * | 7/2004 | Chasen et al. | 707/999.003 |
| 7,437,358 B2 * | 10/2008 | Arrouye et al. | 707/999.004 |
| 2002/0133491 A1 * | 9/2002 | Sim et al. | 707/10 |
| 2004/0078357 A1 * | 4/2004 | LaChapelle et al. | 707/2 |
| 2005/0055372 A1 * | 3/2005 | Springer et al. | 707/104.1 |
| 2005/0172124 A1 | 8/2005 | Carpentier et al. | |
| 2005/0289394 A1 * | 12/2005 | Arrouye et al. | 714/15 |
| 2006/0004787 A1 * | 1/2006 | Borthakur et al. | 707/100 |
| 2007/0156698 A1 * | 7/2007 | Gebhart et al. | 707/10 |
| 2007/0260592 A1 * | 11/2007 | Anglin et al. | 707/4 |
| 2007/0282907 A1 * | 12/2007 | Chambers | 707/104.1 |
| 2008/0040388 A1 * | 2/2008 | Petri et al. | 707/104.1 |

OTHER PUBLICATIONS

Wikipedia, MP3 From Wikipedia, Feb. 17, 2006, retrieve from web archive http://replay.web.archive.org/20060217223442/http://en.wikipedia.org/wiki/MP3, 9 pages.*
Timmerer, Christian, et al., "An Evaluation of Existing Metadata Compression and Encoding Technologies for MPEG-21 Application," Department of Information Technology (ITEC), Klagenfurt University, Technical Report No. TR/ITEC/05/1.12, Oct. 2005, 7 pages.
Rao, Goutham, et al., "Multiple File Compaction for Network Attached Storage," filed Feb. 27, 2008.
Office Action mailed May 26, 2010, for U.S. Appl. No. 12/038,223.

(Continued)

*Primary Examiner* — Phong Nguyen
(74) *Attorney, Agent, or Firm* — Kwan & Olynick LLP

(57) ABSTRACT

Mechanisms are provided for optimizing files while allowing application servers access to metadata associated with preoptimized versions of the files. During file optimization involving compression and/or compaction, file metadata changes. In order to allow file optimization in a manner transparent to application servers, the metadata associated with preoptimized versions of the files is maintained in a metadata database as well as in an optimized version of the files themselves.

21 Claims, 8 Drawing Sheets

OTHER PUBLICATIONS

Final Office Action mailed Oct. 28, 2010, for U.S. Appl. No. 12/038,223.
Office Action mailed May 6, 2011, for U.S. Appl. No. 12/038,223.

Sunna, William, et al., "Enabling Agile BI with a Compressed Flat Files Architecture," Business Intelligence Journal, vol. 15, No. 2, retrieved Mar. 28, 2011, pp. 29-35.

* cited by examiner

Figure 2

| Metadata Database 201 | | | | | |
|---|---|---|---|---|---|
| Identifier 211 | Access Time 213 | Metadata 215 | | | |
| | | Name 221 | Create Time 223 | Size 225 | Ownership 227 | Group Ownership 229 |
| Metadata Database Entry 231 | | | | | |
| Metadata Database Entry 233 | | | | | |
| Metadata Database Entry 235 | | | | | |

| Optimized Multiple File Preamble 401 | |||||
|---|---|---|---|---|---|
| Next Index 411 | | | Next Offset 413 | | |
| Data Offset 421 | | | Data Length 423 | | |
| Data Offset 425 | | | Data Length 427 | | |
| Data Offset 429 | | | Data Length 431 | | |
| 1 | Metadata 433 | 1 | Metadata 435 | | 1 |
| 1 | Metadata 437 | 1 | Metadata 439 | | 1 |
| 1 | Metadata 443 | 1 | Metadata 445 | | 1 |
| Compressed Data 451 | |||||
| Compressed Data 453 | |||||
| Compressed Data 455 | |||||

Figure 4

VIRTUALIZATION OF METADATA FOR FILE OPTIMIZATION

DESCRIPTION OF RELATED ART

The present disclosure relates to file optimization. In some examples, the techniques of the present disclosure provide mechanisms for virtualization of metadata for file compression and/or compaction.

Network attached storage (NAS) provides application servers the ability to store and access files on file servers over a network. Like direct attached storage and unlike block based storage area networks (SANs), NAS is a file based system that offloads file management operations from application servers to file servers. The file servers themselves may include hard drives, redundant arrays of independent disks (RAIDs), and may be connected to tape drives and tape emulators. File servers are connected to application servers using protocols such as Network File System (NFS), Server Message Block (SMB), etc.

NAS provides a robust mechanism for storing and managing large amounts of data. However, maintaining vast amounts of data is expensive not just in terms of the physical hardware costs, but also in terms of system administration and infrastructure costs. Some mechanisms allow compression of data to save on resources. For example, some file formats such as the Portable Document Format (PDF) are already compressed. Some other utilities allow compression on an individual file level in a relatively inefficient manner. Still other mechanisms allow for more efficient tape backup of data. Instead of backing up all data repeatedly, mechanisms are provided to select changed blocks of data for backup.

However, existing mechanisms for maintaining and managing large amounts of data have a variety of drawbacks and limitations. Consequently, the techniques and mechanisms of the present invention provide improved mechanisms to efficiently optimize files.

Overview

Mechanisms are provided for optimizing files while allowing application servers access to metadata associated with preoptimized versions of the files. During file optimization involving compression and/or compaction, file metadata changes. In order to allow file optimization in a manner transparent to application servers, the metadata associated with preoptimized versions of the files is maintained in a metadata database as well as in an optimized version of the files themselves.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

FIG. 2 illustrates a particular example of a metadata database.

FIG. 4 illustrates a particular example of a compacted file.

DESCRIPTION OF PARTICULAR EMBODIMENTS

Figure 1:
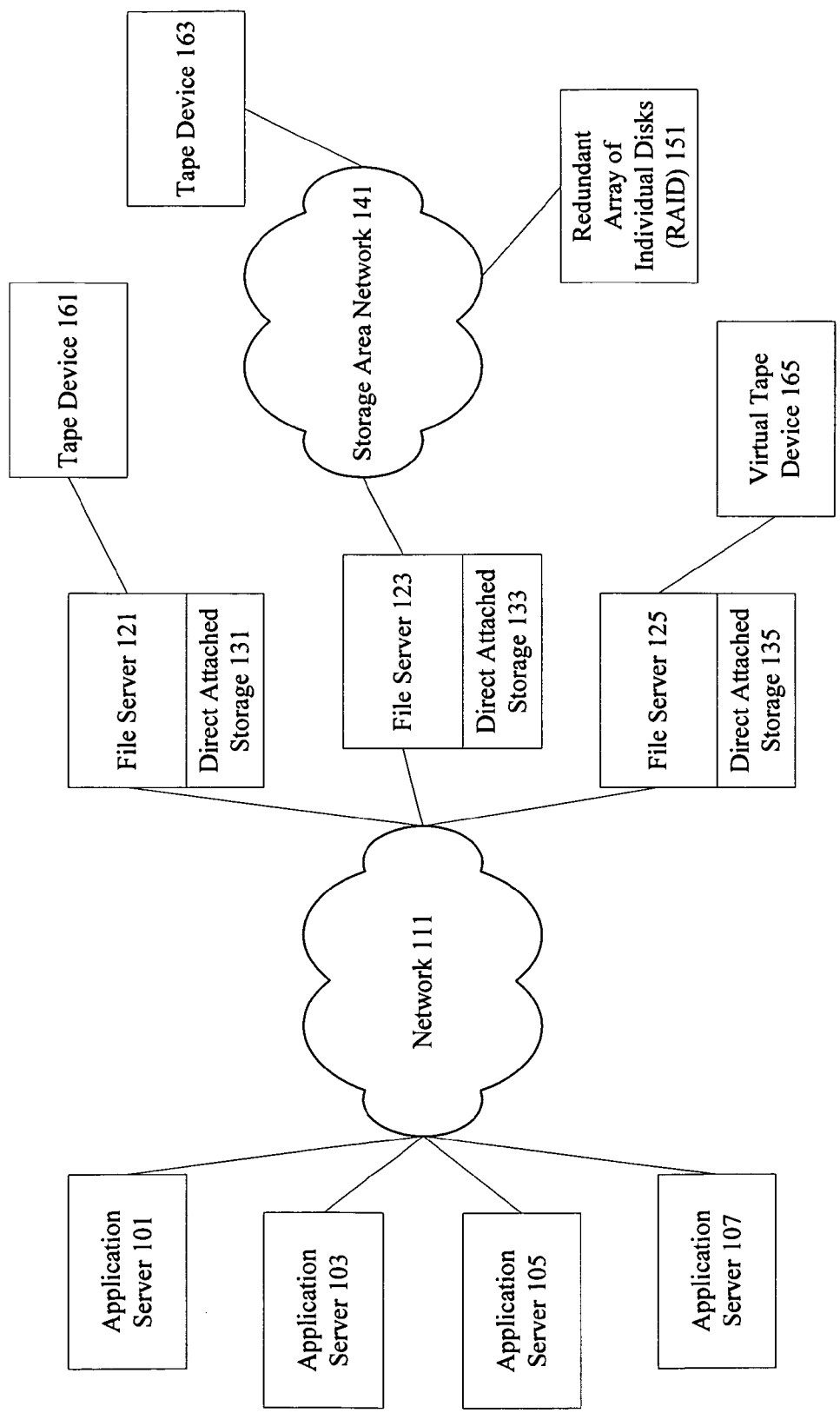
FIG. 1 illustrates a particular example of a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular servers. However, it should be noted that the techniques and mechanisms of the present invention can be used with a variety of devices including general computing devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

In a network attached storage (NAS) system, application servers are connected to file servers over a network. The file servers provide application servers with access to storage through a network file system. The storage provided by the file servers can generally be classified into online and offline storage. Online storage includes direct attached storage (DAS) and storage area networks (SANs) that provide relatively fast read and write access mechanisms. Offline storage includes tape devices and virtual tape devices that tend to have more methodical read and write access mechanisms. In some instances, read and write access to offline storage must occur in block based sequential order.

File servers provide both online storage and offline storage. Users associated with application servers can make file level calls to access data associated with file servers. In many instances, the amount of data managed by file servers is substantial, and costs associated with storing and accessing the data is significant. These costs include not only power and cooling costs but system maintenance, network bandwidth, and hardware costs as well.

Some efforts have been made to reduce the footprint of data maintained by file servers. A variety of utilities compress files on an individual basis prior to writing data to file servers. Although individual file compression can be effective, it often provides inefficient compression. Decompression is also not particularly efficient. Other mechanisms include data deduplication. In a file server system, deduplication is hidden from users and applications. Data deduplication reduces storage footprints by reducing the amount of redundant data. In many instances, deduplication looks within a file and saves unique iterations of each block or bit.

Each chunk of data is processed using a hash algorithm such as MD5 or SHA-1. This process generates a unique number for each piece which is then stored in an index. If a file is updated, only the changed data is saved. That is, if only a few bytes of a document or presentation are changed, only changed portions are saved. In some instances, deduplication searches for matching sequences using a fixed or sliding window and uses references to matching sequences instead of storing the matching sequences again.

However, searching for matching sequences using fixed or sliding windows still does not necessarily provide highly efficient file optimization results. It is often difficult or impossible to determine a proper sequence size for evaluating matches. An efficient size for one application may be very inefficient for another application. Furthermore, implementing a data deduplication system can be disruptive.

Consequently, the techniques and mechanisms of the present invention provide mechanisms for more efficiently allowing optimization of data in a NAS system. An existing network file system and name space is maintained while adding the ability to seamlessly integrate file optimization into a NAS. According to various embodiments, an optimization tool can aggressively compress and compact files based on characteristics of particular files and file types as well as based on characteristics across multiple files. According to various embodiments, any processed file that may be smaller, more efficiently read and transmitted, and/or more effectively stored than a non-processed file is referred to herein as an optimized file. Any individual file that is processed to increase the storage efficiency of the file is referred to herein as a compressed file. Any file associated with a group of files that are processed to increase the storage efficiency of the group of files is referred to herein as a compacted file. That is, instead of simply optimizing a single file, multiple files can be optimized efficiently.

However, it is recognized that performing optimization across files poses distinct challenges. The techniques and mechanisms of the present invention recognize that when a file is optimized, either with compression or compaction, some of the original metadata for a file is changed. Metadata may include file size, the time a file was last accessed, file ownership, group associations, address information, thumbnails, etc. In order for optimization on a file server to remain transparent to application servers, the original metadata needs to be maintained and returned when an application requests the file metadata.

According to various embodiments, the original metadata, along with possible extended metadata, is stored in a database as well as in an optimized file itself to allow for application server access. When an application requests file metadata, the request is intercepted by a file area metadata service and a metadata database is accessed for the file metadata. Providing a metadata database allows maintenance of metadata and extended metadata without replacing a file system or a namespace. The metadata database also allows for efficient processing of batch requests. Non-optimized files and associated requests for non-optimized file metadata can be handled by passing through any requests for such metadata.

The techniques and mechanisms of the present invention recognize that benefits can be provided by also including the original metadata and any possible extended data in an optimized version of the file itself. For example, metadata can be associated with the header of an optimized file. This allows for backup of individual files, groups of files, and directories without backing up the metadata database. In particular examples, a file area metadata service also allows lockout of rogue clients. A client accessing an optimized file without going through a file area metadata service would get inaccurate data and possibly cause other system errors. However, the techniques of the present invention recognize that rogue clients can be prevented from accessing inaccurate data by having a file area metadata service set as the owner of an optimized file. If a client inappropriately attempts to access an optimized file, the client will receive a permissions error.

Using a file area metadata service allows the capture of extended and modified metadata while keeping the ability to perform optimizations of individual files, groups of files, or directories. There is little hindrance on performance of a NAS as batch mode operations proceed efficiently and unoptimized files are processed appropriately. Furthermore, only clients operable to handle optimized files are allowed to access optimized files.

FIG. 1 illustrates a particular example of a network that can use the techniques and mechanisms of the present invention. Applications servers 101, 103, 105, and 107 are connected to file servers 121, 123, and 125 through a network 111. A network 111 may be a single network or a combination of different networks. According to various embodiments, each application server 101, 103, 105, and 107 runs applications that require data storage. The file servers 121, 123, and 125 provide data storage through active storage mechanisms such as disk arrays. One example of active storage is a Redundant Array of Individual Disks (RAID) 151 connected to file server 123 through storage area network (SAN) 141. The file servers 121, 123, and 125 also provide data storage through passive storage mechanisms such as tape devices 161 and 163, and virtual tape device 165.

According to various embodiments, applications servers 101, 103, 105, and 107 are connected to file servers 121, 123, and 125 using file level protocols such as Server Message Block (SMB), Network File System (NFS), or the Andrew File System (AFS) that are capable of providing network attached storage (NAS) to heterogeneous clients. In particular examples, NAS includes both a file system and storage. SMB, NFS, and AFS generally allow application servers 101, 103, 105, and 107 to access data at the file level. The file servers 121, 123, and 125 then use block level protocols such as serial advanced technology attachment (SATA), Internet Small Computer Systems Interface (iSCSI), and storage area networks (SANs) to access individual blocks of data.

Block level protocols generally do not provide any file system capabilities to file servers but instead leave file system operations on the application server side. The data accessed by the file servers 121, 123, and 125 may be physically stored on direct attached storage 131, 133, and 135, such as hard drives included in the corresponding file servers. Alternatively, the data may be physically stored on tape devices 161 or 163, or on virtual tape device 165. A virtual tape device 165 may be implemented as an array of disks. The data may also be stored on RAID 151 connected over a SAN 141.

According to various embodiments, a file area metadata service may be implemented at application servers 101, 103, 105, and 107, at network 111, or at file servers 121, 123, and 125 or at a combination of entities. The file area metadata service intercepts client request and responds to the client request with a response expected by the client. For example, if a client associated with application server 101 requests the size of a particular file, the size of the particular file in non optimized form is provided in the response even though the particular file may now have a different size because of compression and/or compaction. In particular examples, the file area metadata service may intercept the request at an application server 101, at a switch in a network 111, or at a file server 121 and respond with the appropriate metadata. The namespace can continue to be maintained by the file system.

FIG. 2 is illustrates a particular example of a metadata database. Many file systems keep file metadata out-of-band. Some systems keep metadata in directory entries. Others keep metadata in specialized structures like inodes or even in the name of a file. Metadata can range from simple timestamps, mode bits, and other special-purpose information used by the implementation itself, to icons and free-text comments, to arbitrary attribute-value pairs.

The techniques and mechanisms of the present invention contemplate a metadata database 201 having metadata database entries 231, 233, and 235. According to various embodiments, each entry includes an identifier 211, an access time 213, and metadata 215. In particular examples, metadata 215 includes name 221, create time 223, size 225, ownership 227, and group ownership 229. According to various embodiments, the identifier 211 is a unique identifier such as an inode number associated with a file. The inode number of a file can be used as a lookup key as the inode number does not change during the lifetime of a file. A variety of time stamps can be used to allow post-retrieval validation. According to various embodiments, timestamps in a metadata database are compared with timestamps in a corresponding file. The comparison avoids possible misuse of stale metadata database entries for a recently restored file.

Figure 3:
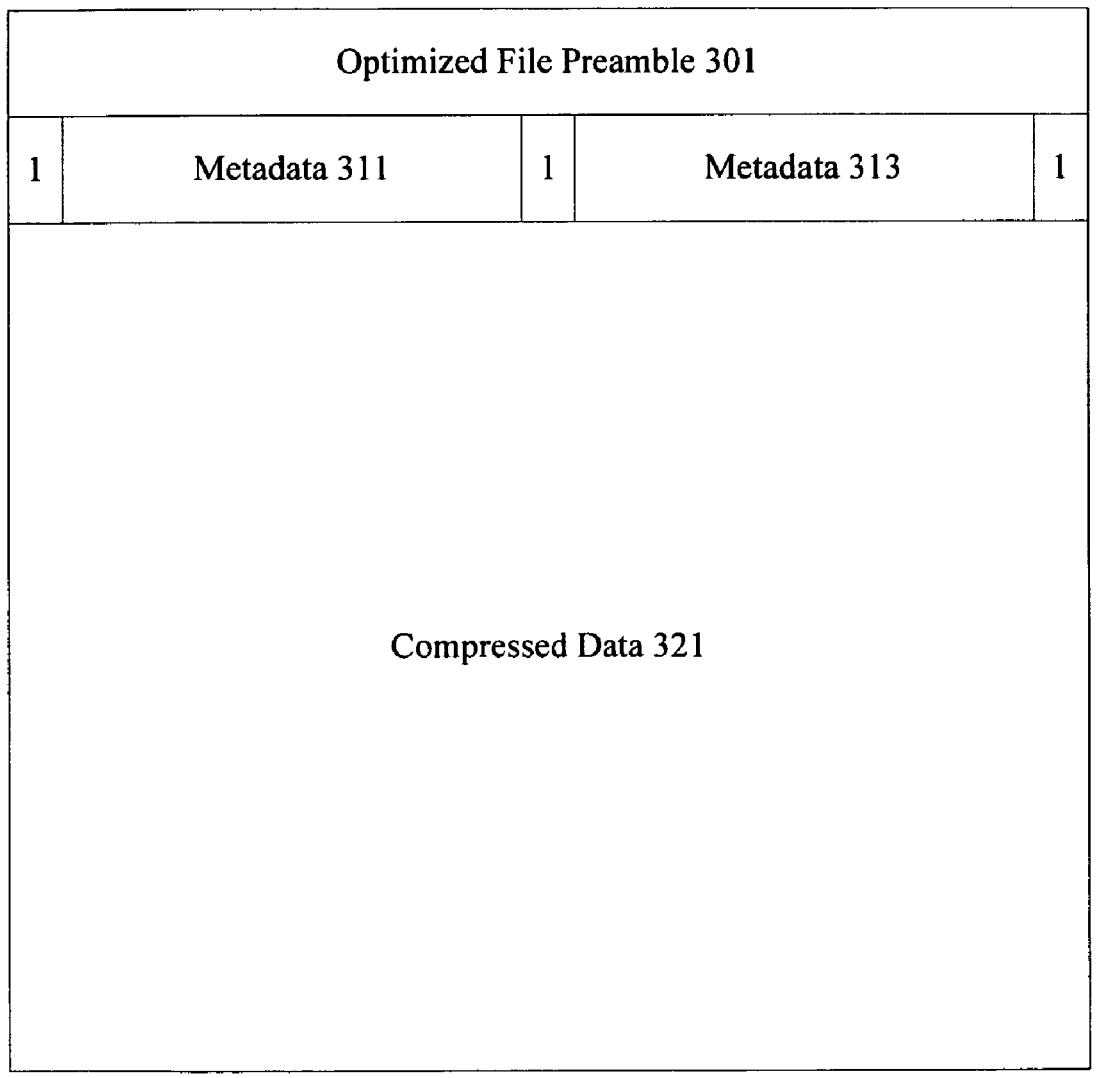
FIG. 3 illustrates a particular example of a compressed file.

FIG. 3 illustrates one example of an optimized file. The optimized file includes an optimized file preamble 301. The optimized file also includes compressed data 321. According to various embodiments, metadata is written twice as metadata 311 and metadata 313. Individual bits surround metadata fields 311 and 313. In particular examples, if the bits surrounding a particular metadata entry have not been written, the metadata entry is not considered to be committed. Using bits surrounding the metadata provides a semblance of an atomic operation. If all bits are written, the metadata 311 and 313 can be considered accurately written. If some surrounding bits are not yet written, the metadata may be considered as not yet committed. According to various embodiments, metadata 311 and metadata 313 is configured to be a block size that can be atomically written by a hard drive.

In particular examples, all operations are designed such that, should a crash occur at any point, there is no loss or corruption of data. However, there can be stale files or database entries left behind. Attempting to eliminate this possibility is a very complex problem which dictates the need for transactional semantics across multiple file system and database operations. Since the situation arises only when a poorly-timed failure occurs, and results only in additional space usage, the entire design is not burdened with excess complexity. According to various embodiments, a periodic garbage collection routine is used to discover and clean up any unnecessary files or database entries.

It should be noted that namespace information continues to be maintained by the file system and need not to be stored in any compressed file.

FIG. 4 illustrates another example of an optimized file. According to various embodiments, the optimized files may be compacted files having information obtained from multiple files or all files in a directory. The techniques of the present invention recognize that data can be more efficiently optimized when multiple files instead of individual files are evaluated for optimization. Patterns and characteristics across files and file types can be analyzed to allow for more efficient compression, storage, and retrieval. An optimized file includes an optimized multiple file preamble 401. The preamble 401 provides some kind of uniqueness to the file. An optimized file including multiple compressed files is also referred to herein as a suitcase file. In some instances, a suitcase file may include all files in a particular directory.

The optimized file includes a next index 411 and a next offset 413 that can be used for adding and deleting compressed and/or compacted data. Data offsets 421, 425, and 429 along with data lengths 423, 427, and 431 are used to determine positions of compressed data 451, 453, and 455. Metadata 433, 437, and 443 are redundantly written as metadata 435, 439, and 445. Commit bits surround metadata 433, 435, 437, 439, 443, and 445. In particular examples, if the bits surrounding a particular metadata entry have not been written, the metadata entry is not considered to be committed. Using bits surrounding the metadata provides a semblance of an atomic operation. If all bits are written, the metadata can be considered accurately written. If some surrounding bits are not yet written, the metadata may be considered as not yet committed. According to various embodiments, metadata is configured to be a block size that can be atomically written by a hard drive.

According to various embodiments, to add an additional file to a suitcase file, an additional data offset and data length field is introduced along with an additional redundant written metadata field. The compressed data itself is added using the data offset and data length introduced. Both compressed and compacted files can be created with relative ease using the optimized file formats shown in FIGS. 3 and 4.

Figure 5:
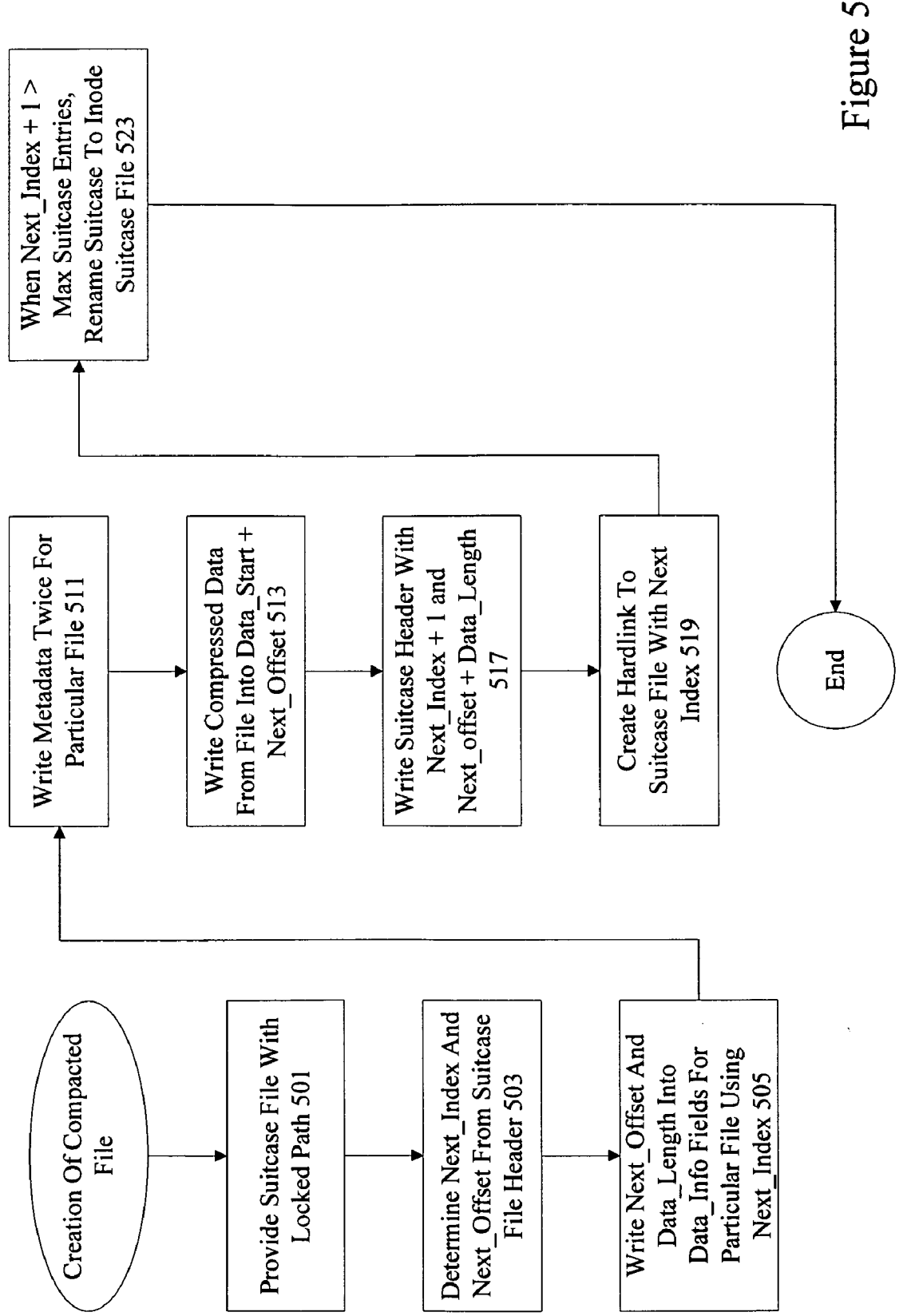
FIG. 5 illustrates a particular example of compacted file creation.

FIG. 5 illustrates one example of compacted file creation. At 501, a suitcase file with a locked path is provided. According to various embodiments, the suitcase file path is locked and the suitcase file itself is opened. If the suitcase file does not exist, a file such as sc.ofs is created. In particular examples, only one active suitcase file is permitted per directory. At 503, the next_index and next_offset are determined from the suitcase file. At 505, the next_offset and data_length fields are written into the data_length and data_info fields for a particular file at the next_index 505 value. At 511, the metadata is written twice for a particular file. At 513, the compressed data from the file is written into the data_start+next_offset position. In some instances, the data from the file may already be compressed or compacted. At 517, a suitcase header is written with next_index+1 and next_offset+data_length.

According to various embodiments, a hard link is created for the suitcase file with filename.<next_index>.ofs at 519. In particular examples, the filename is used to provide uniqueness within the directory. The filename also allows a garbage collector to check that the hard link remains active. A simulated link (symlink) can be associated with an index file name. In this manner, client applications continue to have a consistent view of data files. Symlink files correspond to client application maintained file names. The file name includes an encoded file index for accessing the appropriate metadata and compressed data corresponding to a particular file. In this manner, a client can access metadata and compressed data in a suitcase file while maintaining use of an original file name.

When the next_index+1 reaches a maximum at 523, the suitcase file is renamed to <inode>.sc.ofs. The rename prevents adding new entries into the suitcase file. In particular examples, the inode name guarantees uniqueness within the resource point and, hence, directory. The rename also allows a garbage collector to easily unlink the suitcase once the link count reaches one. The suitcase path can then be unlocked.

Figure 6:
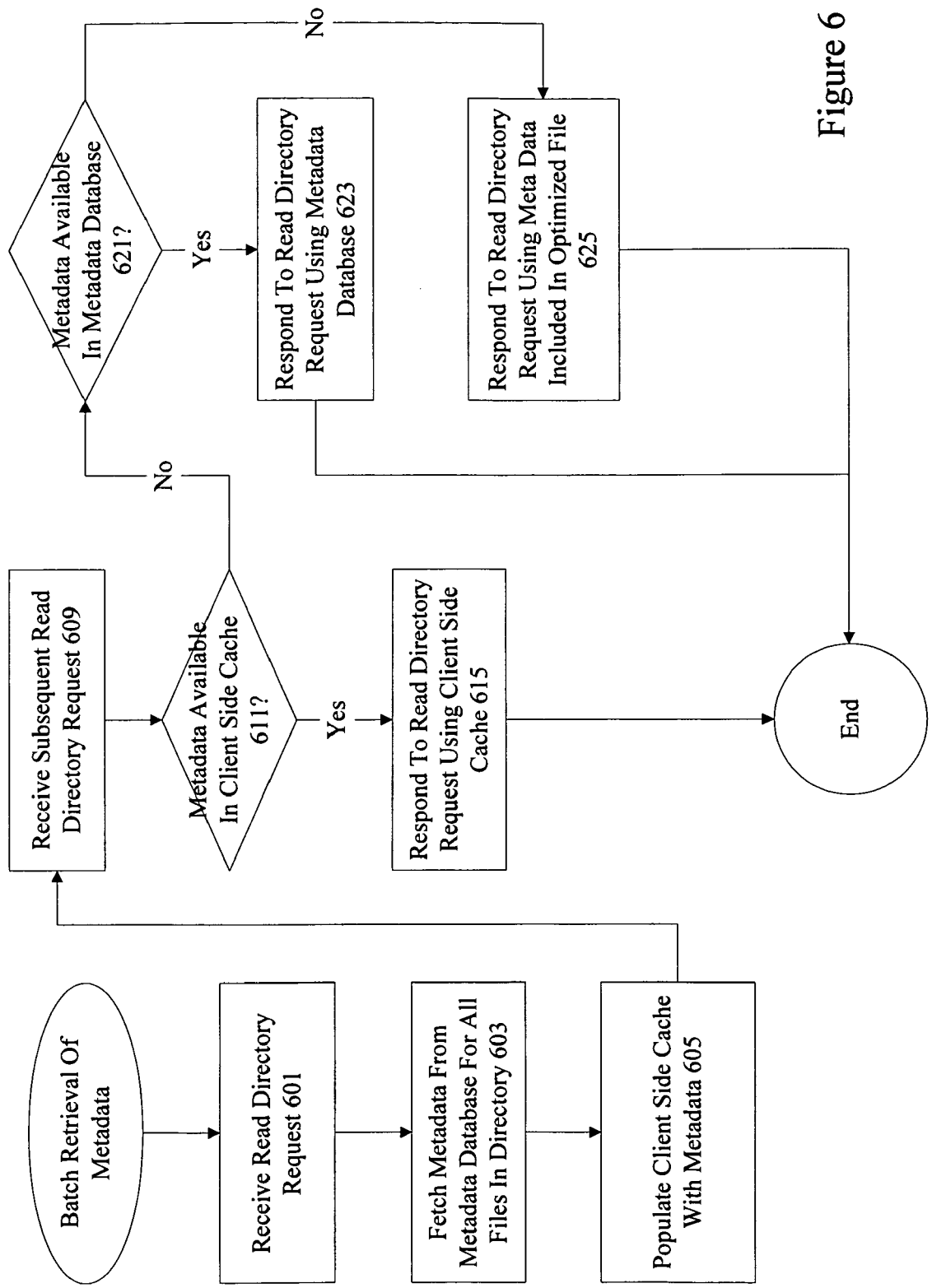
FIG. 6 illustrates a particular example of batch retrieval of metadata.

FIG. 6 illustrates one example of batch retrieval of metadata. According to various embodiments, when an application opens a directory, it typically lists all the files in the directory and then stats each file. To accelerate this common scenario, a batch retrieval scheme is used. A batch retrieval scheme allows a cache close to client applications to be populated efficiently.

According to various embodiments, a read directory request is received at 601. In particular examples, an application opens a directory and a client begins a background pre-fetch operation from the metadata database for all file area metadata service metadata for the given directory at 603. At 605, metadata is placed into a client-side cache as the pre-fetch operation progresses. According to various embodiments, a read directory operation is satisfied entirely from the file system. Subsequent stat calls are then satisfied from cache, without requiring any further metadata database calls or file accesses.

For example, a subsequent read directory request is received at 609. It is determined at 611 if metadata is available in client side cache. If metadata is available in client side cache, the read directory request is handled using client side cache 615. If metadata is not available in client side cache, a metadata database is accessed at 621. The metadata database may be accessed using an identifier to obtain an access time, a name, a create time, a size, ownership information, as well as group ownership information. Time stamps may be compared to determine whether a metadata database entry is valid. If the metadata is available in a metadata database at 621, the read directory request is handled using the metadata database at 623. If the metadata is not available in the metadata database at 621, the read directory request is handled using metadata included in the optimized file 625.

It should be noted that even if the metadata database has an incorrect view of the directory hierarchy, there is no incorrect behavior. Instead, either some cache entries will be unnecessary, or some entries will not be in cache. The worst case is that the client takes a cache-miss and needs to hit the metadata database to get the metadata for an individual file. By relaxing the need for synchronization with a directory hierarchy, only inode to metadata mappings need to be managed. Name to inode mappings are left to the underlying file system.

Figure 7:
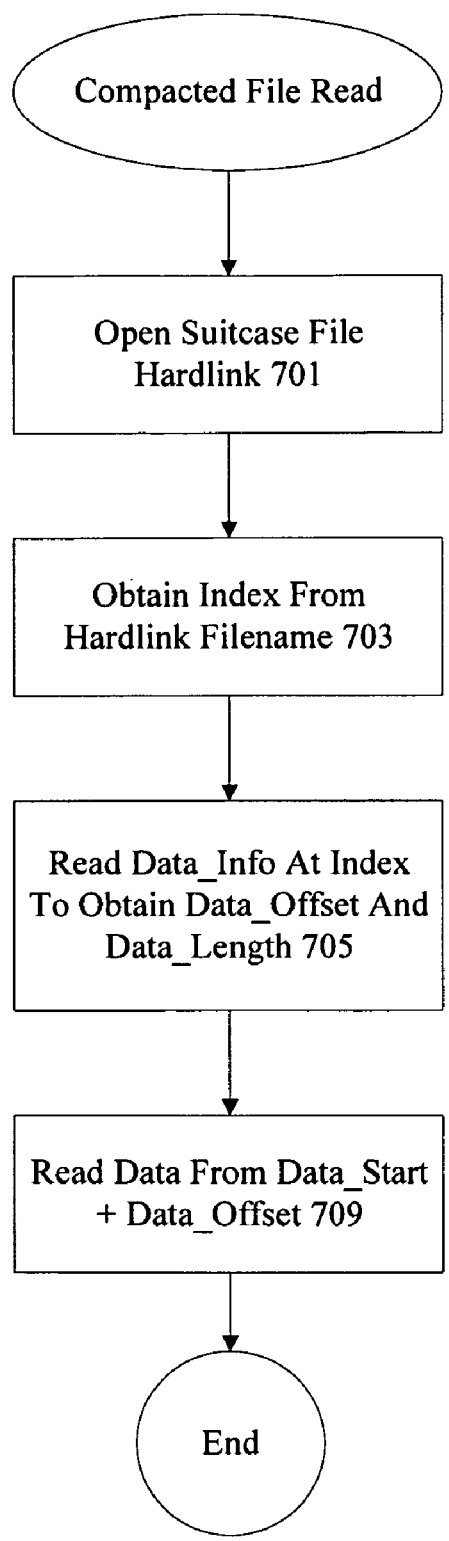
FIG. 7 illustrates a particular example of a compacted file read.

FIG. 7 illustrates one example of a compacted file read. According to various embodiments, a suitcase file hardlink is opened at 701. The suitcase file hardlink may be associated with a symlink that provides a client application with a consistent view of the data files. In particular examples, the index is obtained from the hardlink filename at 703. The data_info is read at the index to obtain data_offset and data_length information at 705. The data is read from data_start+data_offset at 709. In this manner, data can be obtained from a suitcase file while providing a client application with a consistent file name.

According to various embodiments, data can be retrieved using the 64 bit inode number of the file as the lookup key. This number is used since it does not change for the lifetime of the file. It should be noted that for a non-file area metadata service controlled file, a rogue client behaves in the same manner as a file area metadata service supported client. For file area metadata service controlled file, a rogue client will receive permissions errors from the file system, since such a file will be owned a different user such as a file area metadata service associated user.

Figure 8:
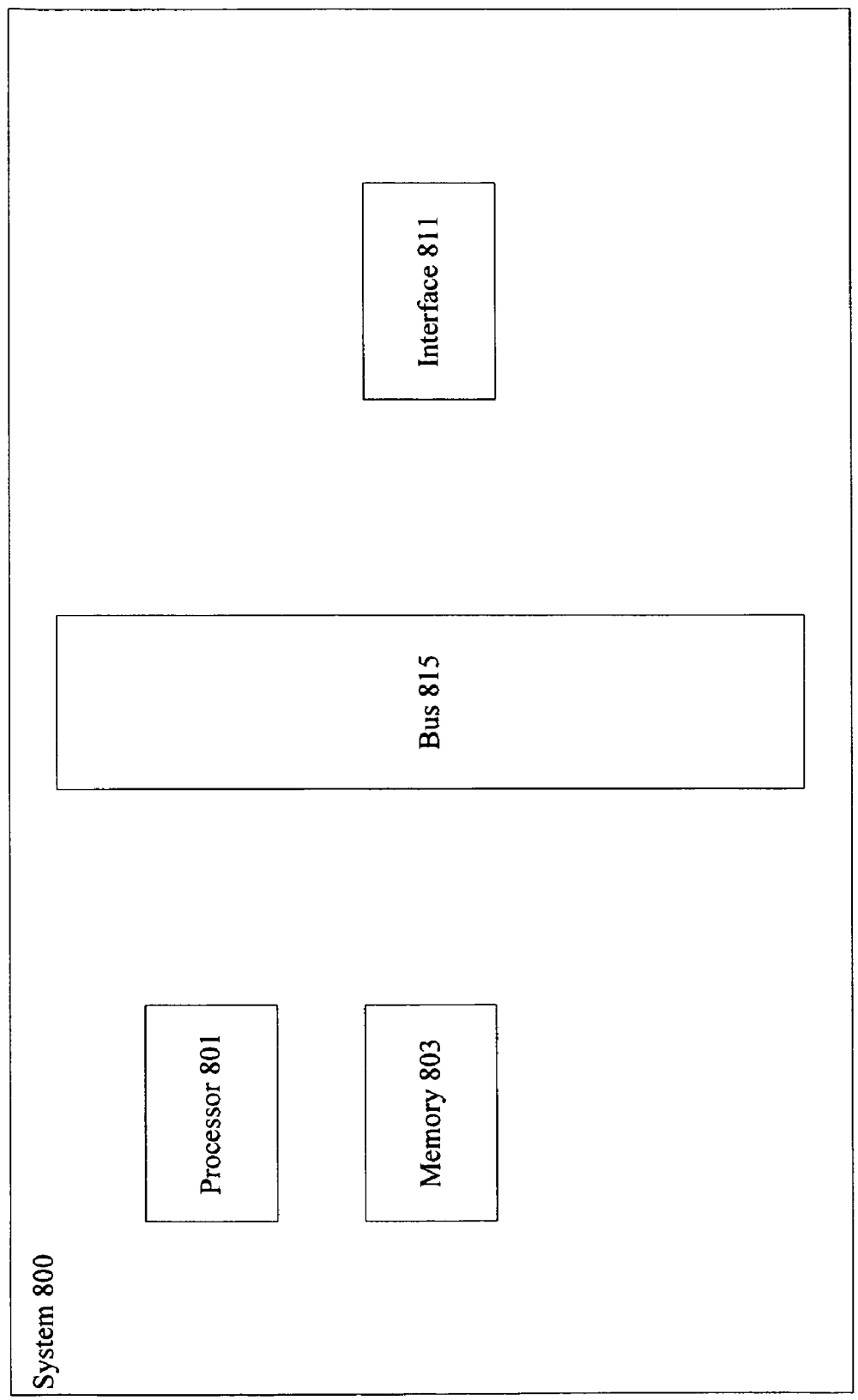
FIG. 8 illustrates a particular example of a computer system.

A variety of devices and applications can implement particular examples of discovery. FIG. 8 illustrates one example of a computer system. According to particular example embodiments, a system 800 suitable for implementing particular embodiments of the present invention includes a processor 801, a memory 803, an interface 811, and a bus 815 (e.g., a PCI bus). When acting under the control of appropriate software or firmware, the processor 801 is responsible for such tasks such as pattern generation. Various specially configured devices can also be used in place of a processor 801 or in addition to processor 801. The complete implementation can also be done in custom hardware. The interface 811 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 800 uses memory 803 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising;
receiving a read directory request, the read directory request corresponding to a directory associated with a plurality of files, wherein the plurality of files are optimized using mechanisms including deduplication;
populating a client side cache with metadata fetched from a metadata database for the plurality of files in the directory upon receiving the read directory request;
receiving a subsequent read directory request;
determining whether metadata needed to respond to the subsequent read directory request is available in the client side cache;
accessing a metadata database if the metadata is not available in the client side cache;
comparing timestamps to determine whether an entry in the metadata database is valid, wherein if the entry is not valid, the subsequent read directory request is handled by accessing metadata included in the plurality of files that are optimized using mechanisms including deduplication and maintained using a suitcase file.

2. The method of claim 1, wherein the metadata database includes file identifiers, access times, and metadata.

3. The method of claim 2, wherein file identifiers include user identifiers, group identifiers, and inode numbers.

4. The method of claim 2, wherein access times include times corresponding files were last accessed.

5. The method of claim 2, wherein metadata includes file names and file sizes associated with preoptimized versions of the plurality of files.

6. The method of claim 1, wherein the metadata database resides at the application server.

7. The method of claim 1, wherein the plurality of optimized files are optimized files that are also compressed.

8. The method of claim 1, wherein the metadata database need not be synchronized with a directory hierarchy.

9. The method of claim 1, wherein accessing metadata included in one of the plurality of optimized files comprises accessing the suitcase file.

10. The method of claim 9, wherein the suitcase file includes metadata and compressed data for the plurality of optimized files.

11. A system comprising;
an interface operable to receive a read directory request, the read directory request corresponding to a directory associated with a plurality files, wherein the plurality of files are optimized using mechanisms including deduplication, wherein a client side is populated with metadata fetched from a metadata database for the plurality of files in the directory upon receiving the read directory request;
a processor operable to determine whether metadata needed to respond to the read directory request is available in the client side cache upon receiving a subsequent read directory request, the processor operable to access the metadata database if the metadata is not available in the client side cache;
wherein timestamps are compared to determine whether an entry in the metadata database is valid, wherein if the entry is not valid, the subsequent read directory request is handled by accessing metadata included in the plurality of files that are optimized using mechanisms including deduplication and maintained using a suitcase file.

12. The system of claim 11, wherein the in the metadata database includes file identifiers, access times, and metadata.

13. The system of claim 12, wherein file identifiers include user identifiers, group identifiers, and inode numbers.

14. The system of claim 12, wherein access times include times corresponding files were last accessed.

15. The system of claim 12, wherein metadata includes file names and file sizes associated with preoptimized versions of the plurality of files.

16. The system of claim 11, wherein the metadata database resides at the application server.

17. The system of claim 11, wherein the plurality of optimized files are optimized files that are also compressed.

18. The system of claim 11, wherein the metadata database need not be synchronized with a directory hierarchy.

19. The system of claim 11, wherein accessing metadata included in one of the plurality of optimized files comprises accessing the suitcase file.

20. The system of claim 19, wherein the suitcase file includes metadata and compressed data for the plurality of optimized files.

21. A non-transitory computer readable medium comprising;
computer code for receiving a read directory request, the read directory request corresponding to a directory associated with a plurality of files, wherein the plurality of files are optimized using mechanisms including deduplication;
computer code for populating a client side cache with metadata fetched from a metadata database for the plurality of files in the directory upon receiving the read directory request;
computer code for receiving a subsequent read directory request;
computer code for determining whether metadata needed to respond to the subsequent read directory request is available in the client side cache;
computer code for accessing a metadata database if the metadata is not available in the client side cache;
computer code for comparing timestamps to determine whether an entry in the metadata database is valid, wherein if the entry is not valid, the subsequent read directory request is handled by accessing metadata included in the plurality of files that are optimized using mechanisms including deduplication and maintained using a suitcase file.

* * * * *